(12) United States Patent
Honda

(10) Patent No.: US 10,545,324 B2
(45) Date of Patent: Jan. 28, 2020

(54) MICROSCOPE APPARATUS

(71) Applicant: OLYMPUS CORPORATION, Hachioji-shi, Tokyo (JP)

(72) Inventor: Susumu Honda, Kanagawa (JP)

(73) Assignee: OLYMPUS CORPORATION, Tokyo (JP)

( * ) Notice: Subject to any disclaimer, the term of this patent is extended or adjusted under 35 U.S.C. 154(b) by 185 days.

(21) Appl. No.: 15/728,726

(22) Filed: Oct. 10, 2017

(65) Prior Publication Data
US 2018/0120549 A1 May 3, 2018

(30) Foreign Application Priority Data
Oct. 27, 2016 (JP) .................. 2016-210761

(51) Int. Cl.
*G02B 21/00* (2006.01)
*G02B 27/28* (2006.01)
*G02F 1/01* (2006.01)

(52) U.S. Cl.
CPC ..... *G02B 21/0076* (2013.01); *G02B 21/0032* (2013.01); *G02B 21/0048* (2013.01); *G02B 21/0068* (2013.01); *G02B 27/283* (2013.01); *G02F 1/0102* (2013.01)

(58) Field of Classification Search
None
See application file for complete search history.

(56) References Cited

U.S. PATENT DOCUMENTS

| 2007/0268574 A1* | 11/2007 | Sasaki | G02B 21/0032 359/385 |
| 2011/0122489 A1 | 5/2011 | Matsuo | |
| 2015/0077819 A1* | 3/2015 | Schnell | G03H 1/14 359/9 |
| 2016/0161729 A1* | 6/2016 | Honda | G02B 21/0048 359/201.2 |

FOREIGN PATENT DOCUMENTS

| EP | 2325683 A3 | 5/2011 |
| JP | 5591007 B2 | 9/2014 |

* cited by examiner

*Primary Examiner* — Jennifer D. Carruth
(74) *Attorney, Agent, or Firm* — Holtz, Holtz & Volek PC

(57) ABSTRACT

A microscope apparatus includes: an objective lens; an observation optical system that makes the specimen be irradiated with excitation light by the objective lens, and acquires image information of the specimen; a first stimulation optical system that includes a scanning section which scans stimulus light, makes the scanning section scan an irradiation position of the stimulus light and applies an optical stimulus to the specimen; a second stimulation optical system that includes an SLM arranged at a pupil conjugate position of the objective lens and capable of modulating a phase of the stimulus light, selectively switches the irradiation position of the stimulus light by the SLM and applies the optical stimulus to the specimen; and a light path selecting section that selects at least one of a light path of the first stimulation optical system and a light path of the second stimulation optical system.

19 Claims, 9 Drawing Sheets

MICROSCOPE APPARATUS

CROSS-REFERENCE TO RELATED APPLICATIONS

This application is based on Japanese Patent Application No. 2016-210761, the contents of which are incorporated herein by reference.

TECHNICAL FIELD

The present invention relates to a microscope apparatus.

BACKGROUND ART

Conventionally, a microscope apparatus that simultaneously stimulates all or some of given regions of a specimen without a time lag or applies an intense stimulus to each given region is known (for example, see the Publication of Japanese Patent No. 5591007 (hereinafter referred to as "JP5591007")). The microscope apparatus described in JP5591007 includes a first stimulation optical system that irradiates each given region with stimulus light by a galvanometer mirror, and a second stimulation optical system that simultaneously irradiates all or some of given regions with stimulus light by a digital micromirror device (DMD) in which a plurality of microelements that reflect or transmit light are arrayed.

CITATION LIST

Patent Literature

{PTL 1}
Japanese Patent No. 5591007

SUMMARY OF INVENTION

One aspect of the present invention is a microscope apparatus including: an objective lens that irradiates illumination light and stimulus light onto a specimen and collects observation light from the specimen; an observation optical system that makes the specimen be irradiated with the illumination light through the objective lens, and acquires image information of the specimen based on the observation light collected by the objective lens; a first stimulation optical system that includes a scanning section which scans the stimulus light irradiated by the objective lens, makes the scanning section scan an irradiation position of the stimulus light on the specimen and applies an optical stimulus to the specimen; a second stimulation optical system that includes a phase modulation element arranged at a pupil conjugate position of the objective lens and capable of modulating a phase of the stimulus light irradiated by the objective lens, selectively switches the irradiation position of the stimulus light on the specimen by the phase modulation element and applies the optical stimulus to the specimen; and a light path selecting section that selects at least one of a light path of the first stimulation optical system and a light path of the second stimulation optical system.

DESCRIPTION OF EMBODIMENTS

{First Embodiment}

A microscope apparatus relating to the first embodiment of the present invention will be described below with reference to the drawings.

Figure 1:
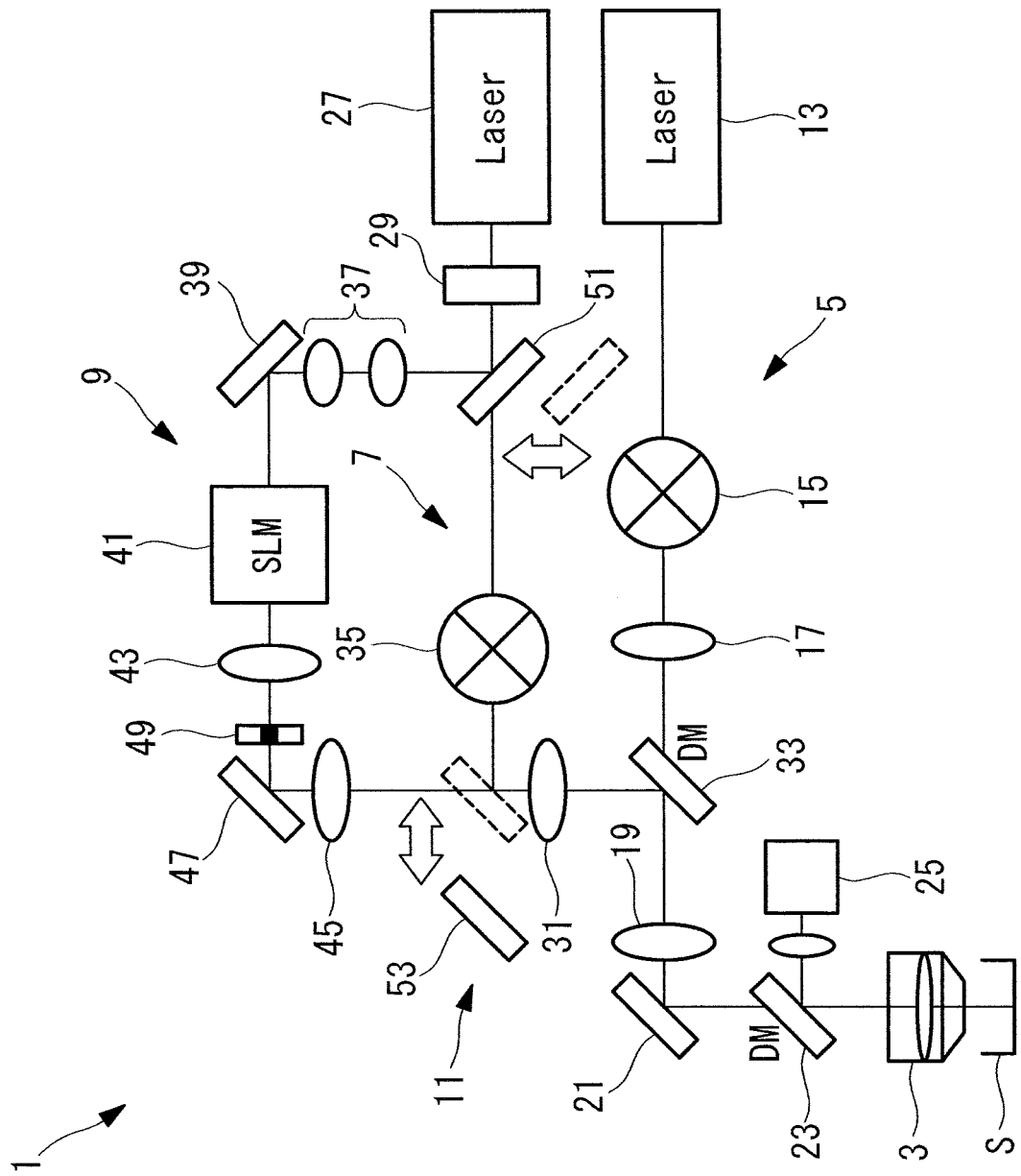
FIG. 1 is a schematic block diagram illustrating a microscope apparatus relating to a first embodiment of the present invention.

A microscope apparatus 1 relating to the present embodiment includes, as illustrated in FIG. 1, an objective lens 3 that irradiates excitation light (illumination light) and stimulus light onto a specimen S and collects fluorescence (observation light) from the specimen S, an observation optical system 5 that acquires image information of the specimen S, a first stimulation optical system 7 and a second stimulation optical system 9 that apply an optical stimulus to the specimen S, and a light path selecting section 11 that selects one of a light path of the first stimulation optical system 7 and a light path of the second stimulation optical system 9.

The observation optical system 5 includes an observation light source (Laser) 13 that generates excitation light for exciting the specimen S and making fluorescence be generated, a scan unit 15 that two-dimensionally scans the excitation light generated from the observation light source 13, a pupil projection lens 17 that focuses the excitation light scanned by the scan unit 15, an image forming lens 19 that collimates the excitation light focused by the pupil projection lens 17 into parallel light, a reflection mirror 21 that reflects the excitation light collimated into the parallel light by the image forming lens 19 toward the objective lens 3, an excitation dichroic mirror 23 that branches the fluorescence from the specimen S collected by the objective lens 3 from a light path of the excitation light, and a detector 25 that detects the fluorescence branched by the excitation dichroic mirror 23.

As the observation light source 13, for example, a near infrared pulse laser that oscillates an ultrashort pulse laser beam (excitation light) of a near infrared region causing multiphoton excitation can be adopted.

The scan unit 15 includes, for example, a close galvanometer mirror scanner (the galvanometer scanner including a pair of galvanometer mirrors (not illustrated) arranged closely to each other, for which a conjugate position of a pupil position of the objective lens 3 is positioned in the middle of the pair of galvanometer mirrors) can be used. The pair of galvanometer mirrors are provided such that a swing angle can be controlled around an axis intersecting an optical axis of the excitation light respectively, and the excitation light can be two-dimensionally scanned by changing and controlling the swing angle of the pair of galvanometer mirrors.

The excitation dichroic mirror 23 transmits the excitation light reflected toward the objective lens 3 by the reflection mirror 21, and reflects the fluorescence from the specimen S collected by the objective lens 3 and returning through the light path of the excitation light toward the detector 25. In addition, the excitation dichroic mirror 23 transmits the stimulus light from the first stimulation optical system 7 and the second stimulation optical system 9.

As the detector 25, for example, a photomultiplier tube (PMT) can be used.

The first stimulation optical system 7 and the second stimulation optical system 9 include, as a configuration in common with each other, a stimulus light source (Laser) 27 that generates the stimulus light for stimulating the specimen S, an alignment mechanism 29 that adjusts a wavelength, a position (SIFT), inclination (TILT) and a beam diameter or the like of the stimulus light generated from the stimulus light source 27, a pupil projection lens 31 that focuses the stimulus light, and a combining dichroic mirror 33 that combines the light path of the stimulus light focused by the pupil projection lens 31 with the light path of the observation optical system 5.

As the stimulus light source 27, for example, a near infrared pulse laser that oscillates the ultrashort pulse laser beam (excitation light) of the near infrared region causing the multiphoton excitation can be adopted. Thus, in the case of applying the optical stimulus to the specimen S by the second stimulation optical system 9, a multiphoton effect can be more effectively generated.

The combining dichroic mirror 33 is arranged on the light path between the pupil projection lens 17 and the image forming lens 19 of the observation optical system 5. The combining dichroic mirror 33 transmits the excitation light from the pupil projection lens 17 of the observation optical system 5 toward the image forming lens 19, and reflects the excitation light from the pupil projection lens 31 of the first stimulation optical system 7 and the second stimulation optical system 9 toward the image forming lens 19.

The first stimulation optical system 7 includes a scanning section 35 that scans the stimulus light which has passed through the alignment mechanism 29. The scanning section 35 is a close galvanometer mirror scanner similar to the scan unit 15.

The second stimulation optical system 9 includes a beam expander 37 capable of changing a beam diameter of the stimulus light which has passed through the alignment mechanism 29, a reflection mirror 39 that reflects the stimulus light which has passed through the beam expander 37, a spatial light phase modulator (phase modulation element, spatial light modulator, referred to as "SLM" hereinafter) 41 capable of modulating a phase of the stimulus light reflected by the reflection mirror 39, a relay optical system formed of a first relay lens 43 and a second relay lens 45 that relay the stimulus light phase-modulated by the SLM 41 to the pupil projection lens 31, and a reflection mirror 47 that reflects the stimulus light relayed by the relay lenses 43 and 45. In addition, the second stimulation optical system 9 includes a mask (light shielding member) 49 that shields 0-order light included in the stimulus light phase-modulated by the SLM 41.

The beam expander 37 increases the beam diameter of the stimulus light according to an effective region of the SLM 41, for example.

The SLM 41 is arranged at a position optically conjugate with the pupil position of the objective lens 3. In addition, the SLM 41 is controlled by a non-illustrated controller to change a wavefront shape of incident stimulus light by phase modulation and perform reflection or transmission. Furthermore, the SLM 41 can switch an irradiation position of the stimulus light according to a phase modulation amount. Thus, the SLM 41 can three-dimensionally change an intensity distribution of the stimulus light on the specimen S and irradiate the specimen S with the stimulus light in a desired three-dimensional pattern. For example, the SLM 41 can irradiate one point on the specimen S with the stimulus light or simultaneously irradiate three-dimensional multiple points on the specimen S with the stimulus light.

The mask 49 is arranged on the light path between the SLM 41 and the reflection mirror 47, for example. In addition, the mask 49 is arranged at a position where the stimulus light from the SLM 41 forms an image by the first relay lens 43, and the specimen S is projected to the mask 49 by an optical system of a latter part formed of the second relay lens 45, the pupil projection lens 31, the image forming lens 19 and the objective lens 3, further.

Since the 0-order light not affected by the phase modulation is included in an axial center of the stimulus light phase-modulated by the SLM 41, around the irradiation position of the 0-order light in the specimen S, the optical stimulus cannot be applied by a desired intensity distribution. By removing the 0-order light included in the stimulus light phase-modulated by the SLM 41 by the mask 49, the optical stimulus by an undesired illumination pattern can be prevented.

The light path selecting section 11 includes a first mirror (reflection member) 51 arranged so as to be inserted and detached on the light path between the alignment mechanism 29 and the scanning section 35, and a second mirror 53 arranged so as to be inserted and detached on the light path between the second relay lens 45 and the pupil projection lens 31. For the light path selecting section 11, the second mirror (reflection member) 53 is inserted onto the light path in the case that the first mirror 51 is detached from the light path, and the second mirror 53 is detached from the light path in the case that the first mirror 51 is inserted onto the light path.

When the first mirror 51 is detached from the light path and the second mirror 53 is inserted onto the light path, the stimulus light which has passed through the alignment mechanism 29 is made incident on the scanning section 35 of the first stimulation optical system 7 as it is, and the stimulus light scanned by the scanning section 35 is reflected by the second mirror 53 and made incident on the pupil projection lens 31. Thus, the specimen S can be irradiated with the stimulus light by the first stimulation optical system 7.

On the other hand, when the first mirror 51 is inserted onto the light path and the second mirror 53 is detached from the light path, the stimulus light which has passed through the alignment mechanism 29 is reflected by the first mirror 51 and made incident on the beam expander 37 of the second stimulation optical system 9, and the stimulus light relayed by the relay lenses 43 and 45 through the reflection mirror 39 and the SLM 41 is made incident on the pupil projection lens 31 as it is. Thus, the specimen S can be irradiated with the stimulus light by the second stimulation optical system 9.

Figure 2:
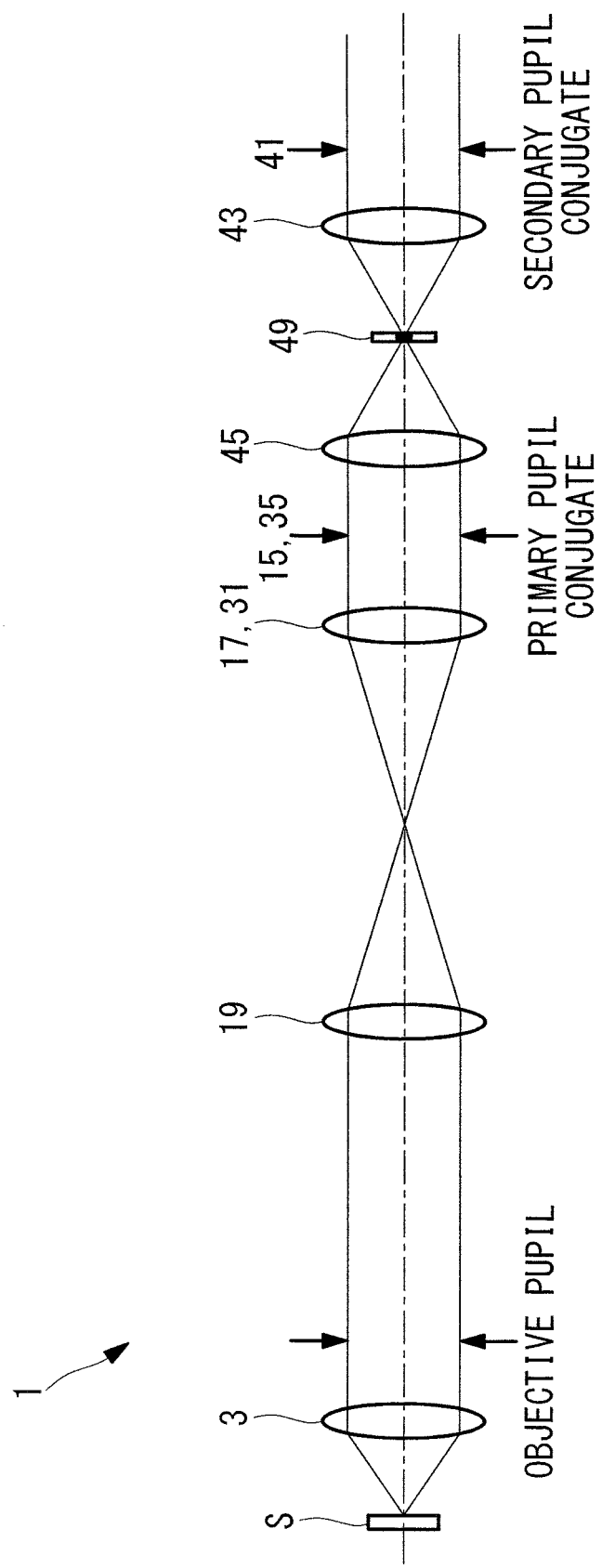
FIG. 2 is a diagram describing a projection relation in the microscope apparatus in FIG. 1.

In the microscope apparatus 1 configured in this way, as illustrated in FIG. 2, the scan unit 15 of the observation optical system 5 and the scanning section 35 of the first stimulation optical system 7 are arranged at a primary pupil conjugate position. An objective pupil is projected to the scan unit 15 by the image forming lens 19 and the pupil projection lens 17, and the objective pupil is projected to the scanning section 35 by the image forming lens 19 and the pupil projection lens 31.

In addition, the SLM 41 is arranged at a secondary pupil conjugate position, and the objective pupil is projected to the SLM 41 by the pupil projection lens 31, the second relay lens 45 and the first relay lens 43. Furthermore, by the objective lens 3, the image forming lens 19, the pupil projection lens 31 and the second relay lens 45, a specimen position is projected to a position of the mask 49.

Figure 3:
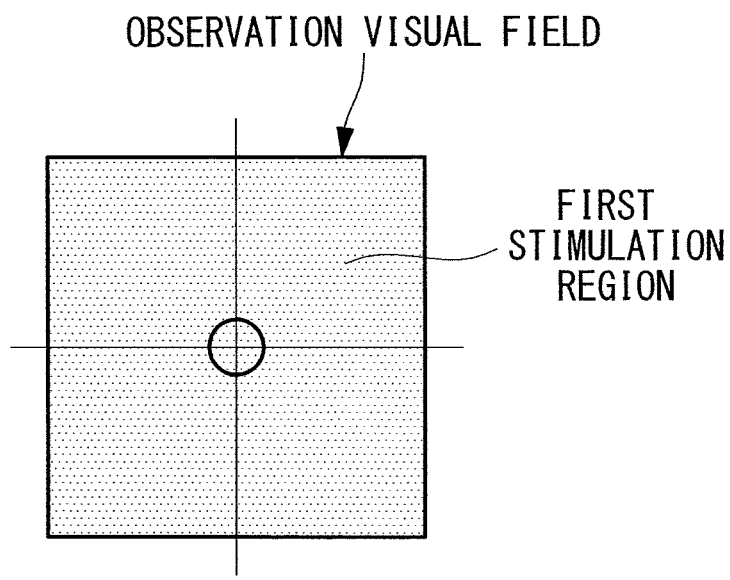
FIG. 3 is a diagram illustrating one example of a relation between an observation visual field of an observation optical system and a stimulation region (first stimulation region) of a first stimulation optical system.

The scan unit 15 of the observation optical system 5 and the scanning section 35 of the first stimulation optical system 7 are optically equivalently arranged. Thus, as illustrated in FIG. 3, an observation visual field of the observation optical system 5 and a stimulation region (expressed as "first stimulation region" in FIG. 3) of the first stimulation optical system 7 in the specimen S are identical. That is, the first stimulation optical system 7 can scan the stimulus light over the entire region of the observation visual field of the observation optical system 5 by the scanning section 35 and thus apply the optical stimulus to the entire region including a center of the observation visual field.

Figure 4:
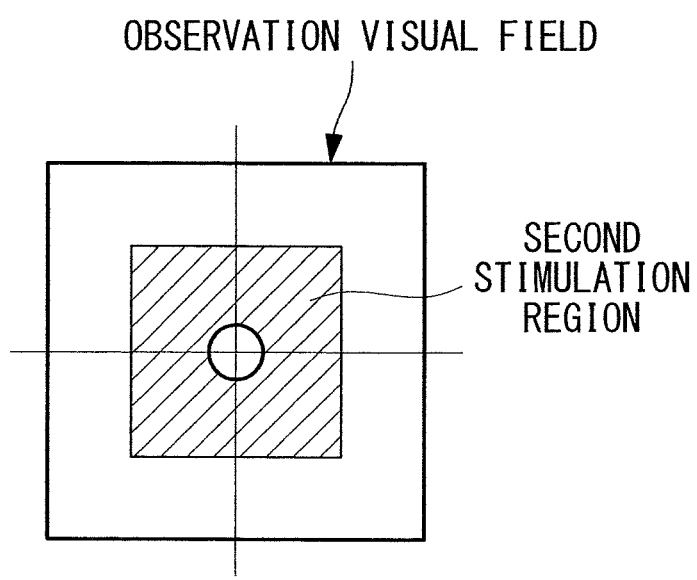
FIG. 4 is a diagram illustrating one example of a relation between the observation visual field of the observation optical system and a stimulation region (second stimulation region) of a second stimulation optical system.

In the second stimulation optical system 9, the stimulation region changes depending on a projection magnification to the SLM 41, and a resolution at each stimulation point is lowered as the stimulation region is increased. In the present embodiment, in order to secure the resolution at each stimulation point, for example, as illustrated in FIG. 4, the stimulation region (expressed as "second stimulation region" in FIG. 4) of the second stimulation optical system 9 is set narrower than the observation visual field of the observation optical system 5.

In addition, the region on the specimen S where the 0-order light is shielded by the mask 49, that is, a vicinity of the center of the observation visual field of the observation optical system 5, is not irradiated with the stimulus light phase-modulated by the SLM 41. Therefore, the second stimulation optical system 9 can apply the optical stimulus to the region narrower than the observation visual field of the observation optical system 5 and the region excluding the vicinity of the center of the observation visual field.

An action of the microscope apparatus 1 configured in this way will be described.

First, the case of performing multiphoton excitation observation on the specimen S by the microscope apparatus 1 relating to the present embodiment will be described. In this case, the excitation light is generated from the observation light source 13 of the observation optical system 5.

The excitation light generated from the observation light source 13 is scanned by the scan unit 15, then transmitted through the excitation dichroic mirror 23 through the pupil projection lens 17, the combining dichroic mirror 33, the image forming lens 19 and the reflection mirror 21, and radiated to the specimen S by the objective lens 3. Thus, the excitation light is two-dimensionally scanned on the specimen S according to an operation of the pair of galvanometer mirrors of the scan unit 15.

The fluorescence generated in the specimen S by scanning the excitation light is collected by the objective lens 3, returns through the light path of a laser beam, and is reflected by the excitation dichroic mirror 23 and detected by the detector 25. That is, the fluorescence from the specimen S is detected by the detector 25 without returning to the scan unit 15 (non-descan detection system).

When the fluorescence is detected by the detector 25, for example, based on intensity information of the detected fluorescence and scanning position information of the excitation light by the scan unit 15 at the time of the detection, a two-dimensional fluorescent image of the specimen S is generated by a non-illustrated PC (personal computer) or the like. Thus, the specimen S can be observed based on the fluorescent image.

Next, the case of applying the optical stimulus to the specimen S by the microscope apparatus 1 relating to the present embodiment will be described.

In the case of applying the optical stimulus to the specimen S by the first stimulation optical system 7, while the first mirror 51 of the light path selecting section 11 is detached from the light path, the second mirror 53 is inserted onto the light path, and the stimulus light is generated from the stimulus light source 27 in the state.

The stimulus light generated from the stimulus light source 27 is, after the wavelength, the beam diameter, the inclination and the position or the like are adjusted by the alignment mechanism 29, made incident on the scanning section 35 of the first stimulation optical system 7 and scanned as it is. The stimulus light scanned by the scanning section 35 is reflected by the second mirror 53 of the light path selecting section 11, transmitted through the excitation dichroic mirror 23 through the pupil projection lens 31, the combining dichroic mirror 33, the image forming lens 19 and the reflection mirror 21, and radiated to the specimen S by the objective lens 3. Thus, the stimulus light is two-dimensionally scanned on the specimen S according to the operation of the pair of galvanometer mirrors of the scanning section 35, and the optical stimulus is applied to each given region of the specimen S.

Next, in the case of applying the optical stimulus to the specimen S by the second stimulation optical system 9, while the first mirror 51 of the light path selecting section 11 is inserted onto the light path, the second mirror 53 is detached from the light path, and the stimulus light is generated from the stimulus light source 27 in the state.

The stimulus light generated from the stimulus light source 27 is, after the wavelength, the beam diameter, the inclination and the position or the like are adjusted by the alignment mechanism 29, reflected by the first mirror 51 of the light path selecting section 11, subjected to beam diameter increase by the beam expander 37 of the second stimulation optical system 9, and made incident on the SLM 41 through the reflection mirror 39.

The stimulus light made incident on the SLM 41 is emitted by changing a wavefront by the phase modulation, and relayed by the relay lenses 43 and 45. Then, the stimulus light is transmitted through the excitation dichroic mirror 23 through the pupil projection lens 31, the combining dichroic mirror 33, the image forming lens 19 and the reflection mirror 21 as it is, and radiated to the specimen S by the objective lens 3. Thus, the specimen S can be irradiated with the stimulus light in a pattern according to the phase modulation amount of the SLM 41, and the optical stimulus can be simultaneously applied to all or some of given regions of the specimen S.

Here, the first stimulation optical system 7 can, as illustrated in FIG. 3, apply the optical stimulus to the entire region including the center of the observation visual field of the observation optical system 5, but can irradiate only each given region of the specimen S with the stimulus light according to a scanning range of the scanning section 35. On the other hand, the second stimulation optical system 9 can simultaneously irradiate the plurality of given regions with the stimulus light according to the phase modulation amount by the SLM 41, but, as illustrated in FIG. 4, can irradiate only the region narrower than the observation visual field of the observation optical system 5 and the region excluding the vicinity of the center of the observation visual field with the stimulus light.

Then, for example, in the case of simultaneously applying the optical stimulus to the plurality of regions without a time lag, it is effective to radiate the stimulus light by the second stimulation optical system 9. In addition, in the case of applying an intense optical stimulus to each given region or applying the optical stimulus to the region that cannot be irradiated with the stimulus light by the second stimulation optical system 9, such as an outer side of the stimulation region of the second stimulation optical system 9 or the vicinity of the center of the observation visual field, it is effective to radiate the stimulus light by the first stimulation optical system 7.

Therefore, by switching the light path of the first stimulation optical system 7 and the light path of the second stimulation optical system 9 by the light path selecting section 11, the optical stimulus can be applied to a desired region in the specimen S at desired timing.

In this case, since the second stimulation optical system 9 selectively switches the irradiation position on the specimen S by modulating the phase of the stimulus light by the SLM 41, a situation that some of the stimulus light is wasted without being utilized as in the case of using a DMD (digital micromirror device) does not occur.

Therefore, according to the microscope apparatus 1 relating to the present embodiment, by the first stimulation optical system 7 and the second stimulation optical system 9, the plurality of regions in the specimen S can be simultaneously stimulated without a time lag or the intense stimulus can be applied to each given region, while keeping a light quantity level.

In addition, in the present embodiment, since the first stimulation optical system 7 and the second stimulation optical system 9 apply the optical stimulus to the specimen S with the stimulus light generated from the stimulus light source 27 in common, the need of preparing the light source for each of the stimulation optical systems 7 and 9 is eliminated, and a cost can be lowered as the number of the light sources is reduced.

The present embodiment can be modified as follows. In the present embodiment, the stimulus light source 27 that generates the stimulus light of a single wavelength is adopted and the light path selecting section 11 including the first mirror 51 and the second mirror 53 that reflect the stimulus light is adopted. However, instead, a stimulus light source that generates the stimulus light of a plurality of wavelengths may be adopted and a light path selecting section including a dichroic mirror that branches or combines the stimulus light may be adopted.

Figure 5:
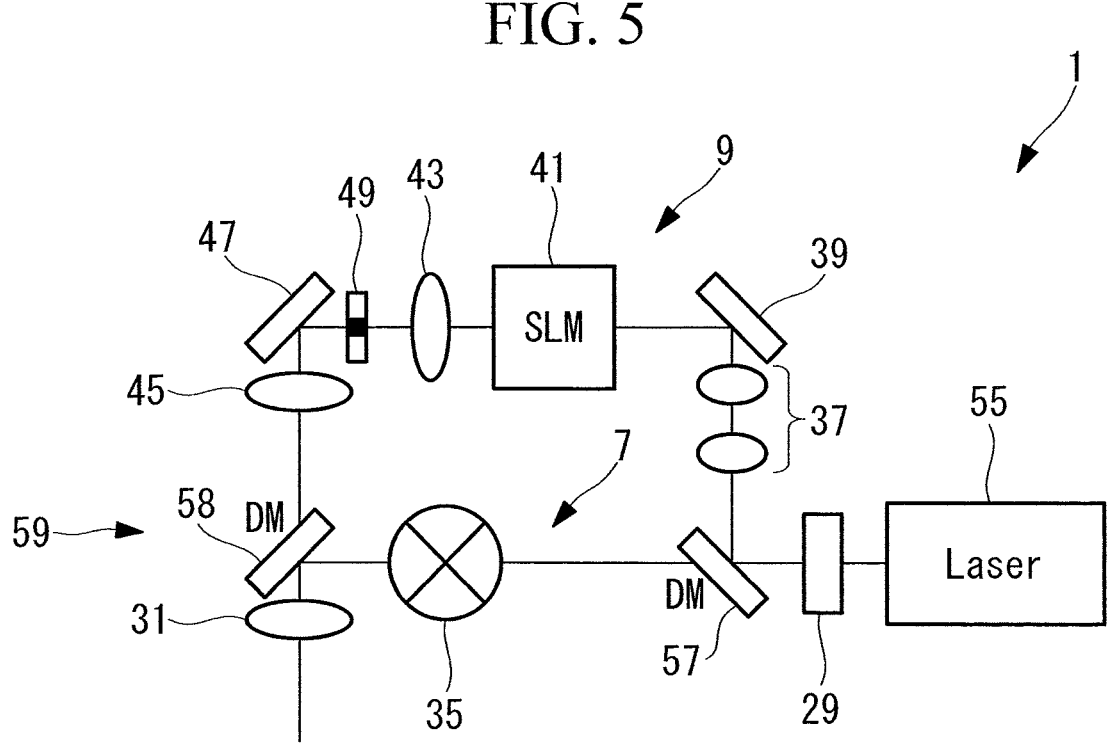
FIG. 5 is a schematic block diagram illustrating a part of one example of the microscope apparatus relating to a modification of the first embodiment of the present invention.

In this case, for example, as illustrated in FIG. 5, a stimulus light source 55 in which the wavelength is a broadband may be adopted. In addition, a light path selecting section 59 including a first dichroic mirror 57 that transmits or reflects the stimulus light from the stimulus light source 55 according to the wavelength and branches the stimulus light into the light path of the first stimulation optical system 7 and the light path of the second stimulation optical system 9 and a second dichroic mirror 58 that reflects the stimulus light from the first stimulation optical system 7 or transmits the stimulus light from the second stimulation optical system 9 and combines the light path of the first stimulation optical system 7 and the light path of the second stimulation optical system 9 may be adopted.

Figure 6:
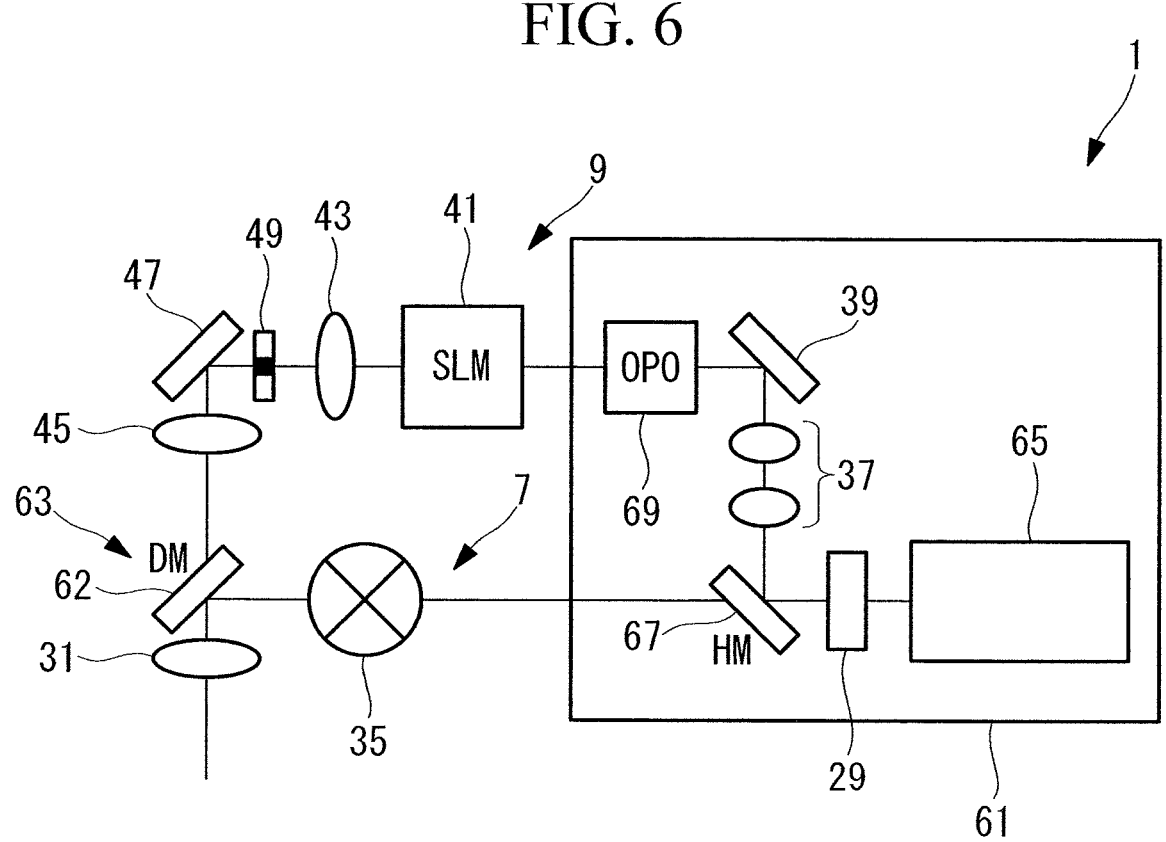
FIG. 6 is a schematic block diagram illustrating a part of another example of the microscope apparatus relating to the modification of the first embodiment of the present invention.

In addition, for example, as illustrated in FIG. 6, a wavelength conversion-type laser light source 61 that simultaneously emits two rays of the stimulus light of different wavelengths may be adopted, and a light path selecting section 63 including a dichroic mirror 62 that combines the light path of the first stimulation optical system 7 and the light path of the second stimulation optical system 9 may be adopted.

The wavelength conversion-type laser light source 61 may include, for example, an oscillation section 65 that generates the stimulus light of the single wavelength, the alignment mechanism 29, a half mirror 67 that transmits some of the stimulus light made incident from the oscillation section 65 through the alignment mechanism 29 according to transmittance and reflects the rest, the beam expander 37, the reflection mirror 39, and a wavelength modulation element (OPO: optical parametric oscillator) 69 that modulates the wavelength of the stimulus light made incident from the half mirror 67 through the beam expander 37 and the reflection mirror 39. Then, the stimulus light of the wavelength transmitted through the half mirror 67 may be made incident on the scanning section 35 of the first stimulation optical system 7, and the stimulus light reflected by the half mirror 67 and wavelength-modulated by the wavelength modulation element 69 may be made incident on the SLM 41 of the second stimulation optical system 9.

According to the present modification, in both configurations of FIG. 5 and FIG. 6, the optical stimulus can be simultaneously applied to the specimen S by the stimulus light of the different wavelengths by the first stimulation optical system 7 and the second stimulation optical system 9.

{Second Embodiment}

Next, the microscope apparatus relating to the second embodiment of the present invention will be described.

Figure 7:
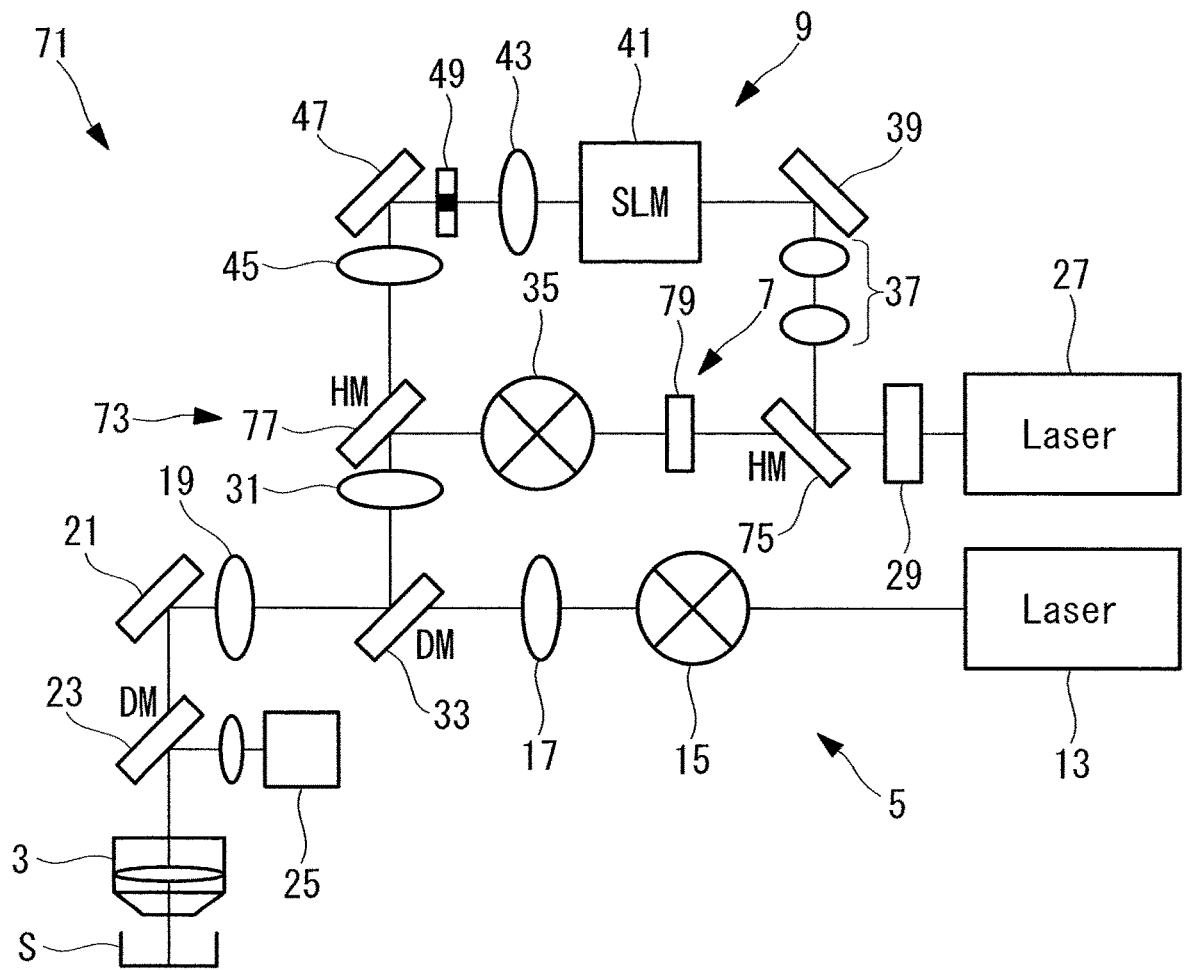
FIG. 7 is a schematic block diagram illustrating the microscope apparatus relating to a second embodiment of the present invention.

A microscope apparatus 71 relating to the present embodiment is different from the first embodiment in the point of including a light path selecting section 73 that selects both of the light path of the first stimulation optical system 7 and the light path of the second stimulation optical system 9, instead of the light path selecting section 11, as illustrated in FIG. 7.

Hereinafter, for parts of the configuration in common with the microscope apparatus 1 relating to the first embodiment, same signs are attached and the description is omitted.

The light path selecting section 73 includes a first half mirror 75 that branches the light path of the stimulus light, and a second half mirror 77 that combines the light path of the stimulus light.

The first half mirror 75 transmits some of the stimulus light which has passed through the alignment mechanism 29 according to the transmittance to be made incident on the scanning section 35 of the first stimulation optical system 7, and reflects the rest to be made incident on the beam expander 37 of the second stimulation optical system 9.

The second half mirror 77 reflects the stimulus light from the scanning section 35 of the first stimulation optical system 7 to be made incident on the pupil projection lens 31, and transmits the stimulus light from the relay lenses 43 and 45 of the second stimulation optical system 9 to be made incident on the pupil projection lens 31.

In addition, the first stimulation optical system 7 includes a shutter 79 capable of intercepting the light path of the stimulus light. The shutter 79 is arranged on the light path between the first half mirror 75 of the light path selecting section 73 and the scanning section 35 of the first stimulation optical system 7, for example, and opens or intercepts the light path between the first half mirror 75 and the scanning section 35 by being opened and closed.

The action of the microscope apparatus 71 configured in this way will be described.

Observation of the specimen S by the observation optical system 5 is similar to the first embodiment, so that the description is omitted, and the optical stimulus of the specimen S by the first stimulation optical system 7 and the second stimulation optical system 9 will be described.

In the case of applying the optical stimulus to the specimen S by the first stimulation optical system 7 and the second stimulation optical system 9, in the state of opening the light path by opening the shutter 79, the stimulus light is generated from the stimulus light source 27. For the stimulus light generated from the stimulus light source 27, after the wavelength, the beam diameter, the inclination and the position or the like are adjusted by the alignment mechanism 29, by the first half mirror 75 of the light path selecting section 73, some is transmitted according to the transmittance and the rest is reflected.

The stimulus light transmitted through the first half mirror 75 passes through the shutter 79, and is scanned by the scanning section 35 of the first stimulation optical system 7, reflected by the second half mirror 77 of the light path selecting section 73, and made incident on the pupil projection lens 31.

On the other hand, the stimulus light reflected by the first half mirror 75 is subjected to the beam diameter increase by the beam expander 37 of the second stimulation optical system 9, reflected by the reflection mirror 39, then phase-modulated by the SLM 41, relayed by the relay lenses 43 and 45, transmitted through the second half mirror 77 of the light path selecting section 73, and made incident on the pupil projection lens 31.

The stimulus light from the first stimulation optical system 7 and the stimulus light from the second stimulation optical system 9 made incident on the pupil projection lens 31 by the second half mirror 77 of the light path selecting section 73, for which the light path is combined, are transmitted through the excitation dichroic mirror 23 through the combining dichroic mirror 33, the image forming lens 19 and the reflection mirror 21, and radiated to the specimen S by the objective lens 3.

Figure 8:
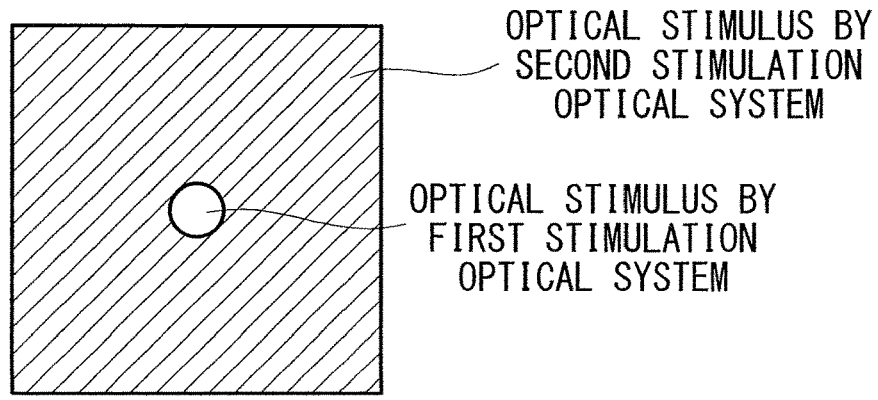
FIG. 8 is a diagram illustrating one example of a relation between the stimulation region by the first stimulation optical system and the stimulation region by the second stimulation optical system of the microscope apparatus in FIG. 7.

Thus, the optical stimulus can be simultaneously applied to the specimen S by the first stimulation optical system 7 and the second stimulation optical system 9. For example, as illustrated in FIG. 8, when the region excluding the vicinity of the center of the observation visual field of the observation optical system 5 is irradiated with the stimulus light by the second stimulation optical system 9 and the vicinity of the center of the observation visual field of the observation optical system 5 is irradiated with the stimulus light by the first stimulation optical system 7, the optical stimulus can be simultaneously applied to all the regions including the center of the observation visual field of the observation optical system 5.

In the case of not applying the optical stimulus to the vicinity of the center of the observation visual field of the observation optical system 5, for example, the light path of the first stimulation optical system 7 may be intercepted by closing the shutter 79, or the stimulus light may be scanned toward the outside of the observation visual field of the observation optical system 5 by the scanning section 35 while the light path of the first stimulation optical system 7 is kept open by opening the shutter 79.

In addition, in consideration of irradiation time, the intensity of the optical stimulus by the SLM 41 of the second stimulation optical system 9 may be increased. Furthermore, an ND filter (neutral density filter) may be provided in the light path of the first stimulation optical system 7 or the light path of the second stimulation optical system 9.

{Third Embodiment}

Next, the microscope apparatus relating to the third embodiment of the present invention will be described.

Figure 9:
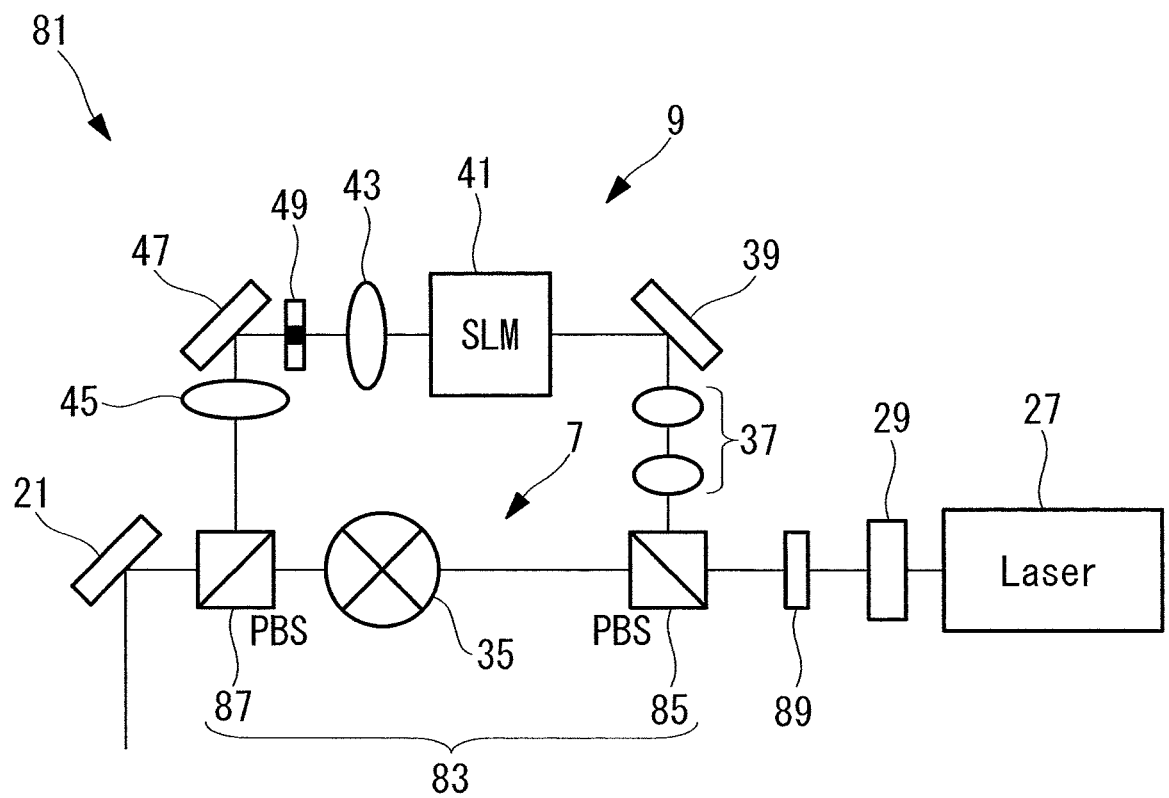
FIG. 9 is a schematic block diagram illustrating a part of the microscope apparatus relating to a third embodiment of the present invention.

A microscope apparatus 81 relating to the present embodiment is different from the first embodiment in the point of including a light path selecting section 83 that selects both of the light path of the first stimulation optical system 7 and the light path of the second stimulation optical system 9, instead of the light path selecting section 11, as illustrated in FIG. 9.

Hereinafter, to the parts of the configuration in common with the microscope apparatus 1 relating to the first embodiment, the same signs are attached and the description thereof is omitted.

The light path selecting section 83 includes a first polarizing beam splitter (PBS) 85 and a second polarizing beam splitter (PBS) 87 that branch and combine the stimulus light from the stimulus light source 27, and a λ/2 plate 89 that changes a polarizing direction of the stimulus light.

Figure 10:
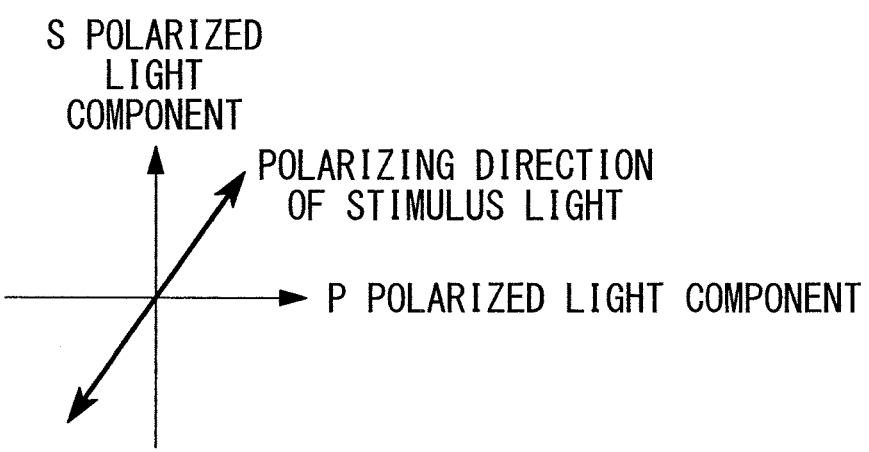
FIG. 10 is a diagram illustrating one example of a polarizing direction of stimulus light by a λ/2 plate of the microscope apparatus in FIG. 9.

The λ/2 plate 89 is arranged on the light path between the alignment mechanism 29 and the first polarizing beam splitter 85 of the light path selecting section 83. The λ/2 plate 89 changes the stimulus light of linearly polarized light generated from the stimulus light source 27 to oblique linearly polarized light as illustrated in FIG. 10. In addition, the λ/2 plate 89 can change a division ratio of polarized light components of S polarized light and P polarized light of the stimulus light by adjusting the angle.

By transmitting a P polarized light component (the polarized light component parallel to the paper face in FIG. 9), for example, of the stimulus light from the λ/2 plate 89 toward the scanning section 35 of the first stimulation optical system 7, and reflecting an S polarized light component (the polarized light component vertical to the paper face in FIG.

9) toward the beam expander 37 of the second stimulation optical system 9, the first polarizing beam splitter 85 branches the light path. For example, in the case of increasing an amount of the stimulus light to irradiate the specimen S with by the SLM 41 of the second stimulation optical system 9, the angle of the λ/2 plate 89 may be adjusted to increase the ratio of the S polarized light component.

By transmitting the stimulus light (P polarized light component, the polarized light component parallel to the paper face in FIG. 9) scanned by the scanning section 35 of the first stimulation optical system 7, and reflecting the stimulus light (S polarized light component, the polarized light component vertical to the paper face in FIG. 9) phase-modulated by the SLM 41 of the second stimulation optical system 9, the second polarizing beam splitter 87 combines the light path.

The action of the microscope apparatus 81 configured in this way will be described.

The observation of the specimen S by the observation optical system 5 is similar to the first embodiment, so that the description is omitted, and the optical stimulus of the specimen S by the first stimulation optical system 7 and the second stimulation optical system 9 will be described.

The stimulus light generated from the stimulus light source 27 is, after the wavelength, the beam diameter, the inclination and the position or the like are adjusted by the alignment mechanism 29, changed to the oblique linearly polarized light by the λ/2 plate 89, and made incident on the first polarizing beam splitter 85 of the light path selecting section 83. The P polarized light component of the stimulus light made incident on the first polarizing beam splitter 85 is transmitted through the first polarizing beam splitter 85, scanned by the scanning section 35 of the first stimulation optical system 7, transmitted through the second polarizing beam splitter 87, and combined with the light path of the second stimulation optical system 9.

On the other hand, the S polarized light component of the stimulus light made incident on the first polarizing beam splitter 85 is reflected by the first polarizing beam splitter 85, subjected to the beam diameter increase by the beam expander 37 of the second stimulation optical system 9, and then phase-modulated by the SLM 41 through the reflection mirror 39. The stimulus light phase-modulated by the SLM 41 is relayed by the relay lenses 43 and 45, then reflected by the second polarizing beam splitter 87 of the light path selecting section 83 and combined with the light path of the first stimulation optical system 7.

The stimulus light from the first stimulation optical system 7 and the stimulus light from the second stimulation optical system 9 for which the light path is combined by the second polarizing beam splitter 87 of the light path selecting section 83 are transmitted through the excitation dichroic mirror 23 through the reflection mirror 21, and radiated to the specimen S by the objective lens 3.

As described above, according to the microscope apparatus 81 relating to the present embodiment, according to the division ratio of the polarized light components of the stimulus light by the λ/2 plate 89, the optical stimulus can be applied to the specimen S by one of the first stimulation optical system 7 and the second stimulation optical system 9 or the optical stimulus can be simultaneously applied to the specimen S by both of them.

Figure 11:
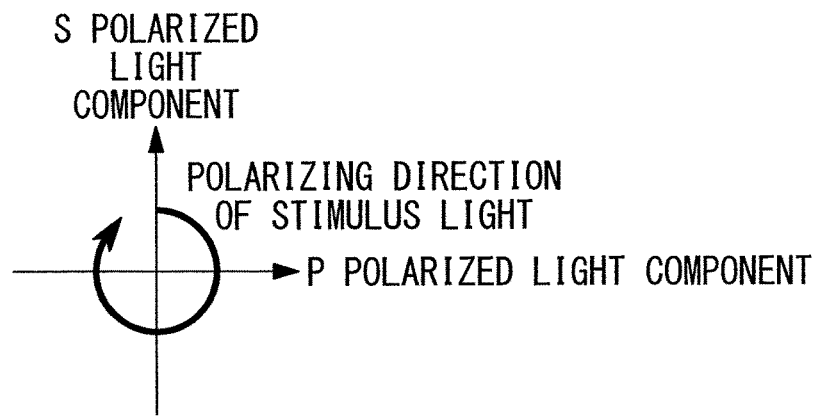
FIG. 11 is a diagram illustrating one example of the polarizing direction of the stimulus light by a λ/4 plate of the microscope apparatus relating to a modification of the third embodiment of the present invention.

In the present embodiment, the λ/2 plate 89 is adopted. However, instead, for example, a λ/4 plate (not illustrated) that changes the stimulus light of the linearly polarized light generated from the stimulus light source 27 to circularly polarized light as illustrated in FIG. 11 may be adopted.

{Fourth Embodiment}

Next, the microscope apparatus relating to the fourth embodiment of the present invention will be described.

Figure 12:
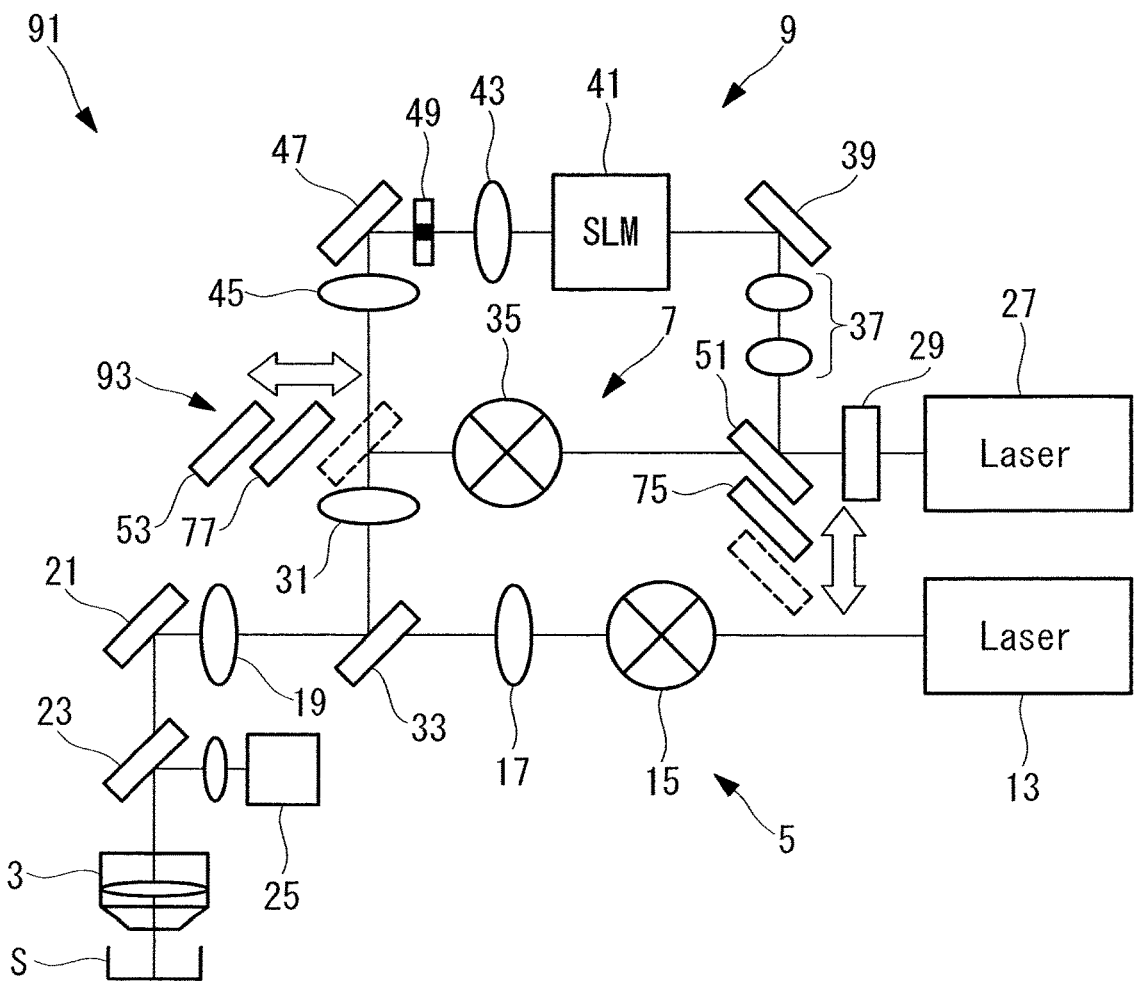
FIG. 12 is a schematic block diagram illustrating the microscope apparatus relating to a fourth embodiment of the present invention.

A microscope apparatus 91 relating to the present embodiment is different from the first embodiment in the point of including a light path selecting section 93 capable of switching a plurality of elements that select the light path of the stimulus light, instead of the light path selecting section 11, as illustrated in FIG. 12.

Hereinafter, to the parts of the configuration in common with the microscope apparatus 1 relating to the first embodiment, the same signs are attached and the description thereof is omitted.

The light path selecting section 93 includes the first mirror 51 and the second mirror 53 that reflect the stimulus light, the first half mirror 75 and the second half mirror 77 that transmit or reflect the stimulus light according to the transmittance, a first dichroic mirror and a second dichroic mirror (both not illustrated) that transmit or reflect the stimulus light according to the wavelength, a first turret (not illustrated) and a second turret (not illustrated). The first turret selectively arranges the first mirror 51, the first half mirror 75 and the first dichroic mirror on the light path of the stimulus light between the alignment mechanism 29 and the scanning section 35 of the first stimulation optical system 7. The second turret selectively arranges the second mirror 53, the second half mirror 77 and the second dichroic mirror on the light path between the second relay lens 45 and the pupil projection lens 31.

The first turret and the second turret include a hole section (not illustrated) that opens the light path of the stimulus light. In the light path selecting section 93, the hole section of the second turret is arranged on the light path in the case of arranging the first mirror 51 on the light path of the stimulus light, and the hole section of the first turret is arranged on the light path in the case of arranging the second mirror 53 on the light path of the stimulus light. In addition, in the light path selecting section 93, the second half mirror 77 is arranged on the light path in the case of arranging the first half mirror 75 on the light path, and the second dichroic mirror is arranged on the light path in the case of arranging the first dichroic mirror on the light path.

According to the microscope apparatus 91 relating to the present embodiment configured in this way, by switching the element to be arranged on the light path of the stimulus light by the light path selecting section 93, the optical stimulus can be applied to the specimen S by a method similar to the method in the configuration of the first embodiment or the second embodiment.

{Fifth Embodiment}

Next, the microscope apparatus relating to the fifth embodiment of the present invention will be described.

Figure 13:
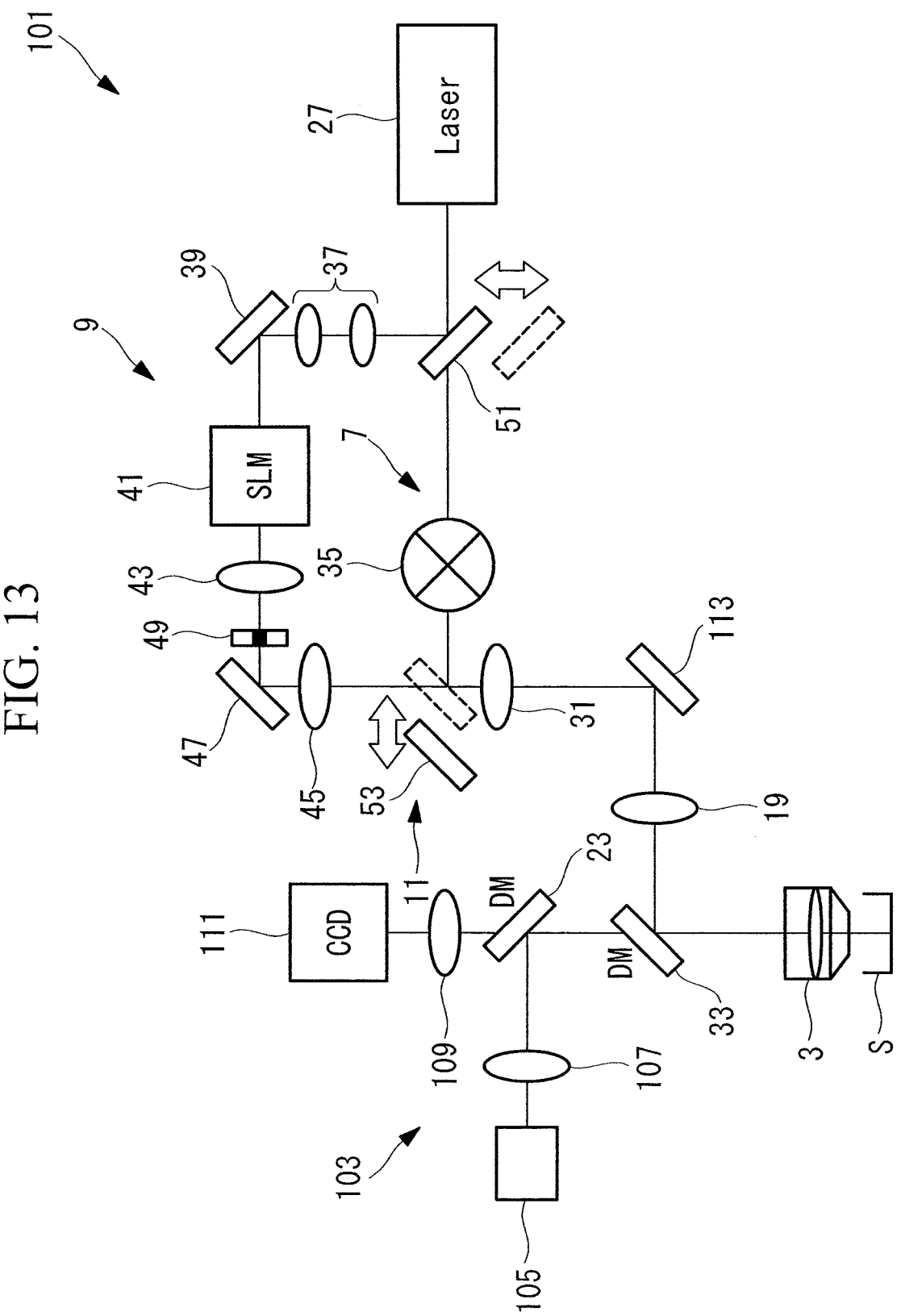
FIG. 13 is a schematic block diagram illustrating the microscope apparatus relating to a fifth embodiment of the present invention.

A microscope apparatus 101 relating to the present embodiment is different from the first embodiment in the point of including an observation optical system 103 adopting an illumination light source 105 like a mercury lamp instead of the observation light source 13 and adopting a CCD (charge coupled device) 111 instead of the detector 25, instead of the observation optical system 5, as illustrated in FIG. 13.

Hereinafter, to the parts of the configuration in common with the microscope apparatus 1 relating to the first embodiment, the same signs are attached and the description thereof is omitted.

The observation optical system 103 includes an illumination lens 107 that collects the illumination light generated from the illumination light source 105 and collimates the illumination light into the parallel light, the objective lens 3 that radiates the illumination light collimated into the parallel light by the illumination lens 107 onto the specimen S and collects the observation light returning from the specimen S, the excitation dichroic mirror 23 that branches the observation light collected by the objective lens 3 and returning through the light path of the illumination light from the light path of the illumination light, and an image forming lens 109 that image-forms the observation light branched from the light path of the illumination light by the excitation dichroic mirror 23 on an imaging surface of the CCD 111.

The first stimulation optical system 7 and the second stimulation optical system 9 include a reflection mirror 113 that reflects the stimulus light focused by the pupil projection lens 31, the image forming lens 19 that collimates the stimulus light reflected by the reflection mirror 113 into the parallel light, and the combining dichroic mirror 33 that combines the light path of the stimulus light collimated into the parallel light by the image forming lens 19 with the light path of the observation optical system 103.

The combining dichroic mirror 33 is arranged on the light path between the excitation dichroic mirror 23 of the observation optical system 103 and the objective lens 3, and has a characteristic of reflecting the stimulus light and transmitting the illumination light and the observation light. In an example illustrated in FIG. 13, the light path selecting section 11 including the first mirror 51 and the second mirror 53 is adopted.

The action of the microscope apparatus 101 configured in this way will be described.

In the case of observing the specimen S by the microscope apparatus 101 relating to the present embodiment, the illumination light is generated from the illumination light source 105 of the observation optical system 103. The illumination light generated from the illumination light source 105 is collected by the illumination lens 107, reflected by the excitation dichroic mirror 23, transmitted through the combining dichroic mirror 33, and radiated to the specimen S by the objective lens 3.

The observation light that returns from the specimen S by irradiation with the illumination light is collected by the objective lens 3, returns through the light path of the illumination light, and is transmitted through the combining dichroic mirror 33 and the excitation dichroic mirror 23, and image-formed on the imaging surface of the CCD 111 by the image forming lens 109. Thus, an image is photographed by the CCD 111 and the image of the specimen S is acquired.

Next, in the case of applying the optical stimulus to the specimen S by the microscope apparatus 101, the stimulus light is generated from the stimulus light source 27. The stimulus light generated from the stimulus light source 27 passes through the light path of the first stimulation optical system 7 or the light path of the second stimulation optical system 9 alternatively selected by the light path selecting section 11, and is combined with the light path of the observation optical system 103 by the combining dichroic mirror 33 through the pupil projection lens 31, the reflection mirror 113 and the image forming lens 19, focused by the objective lens 3, and radiated to the specimen S. Thus, the optical stimulus is applied to the region on the specimen S by the first stimulation optical system 7 or the second stimulation optical system 9.

According to the microscope apparatus 101 relating to the present embodiment, by the image of the specimen S acquired by the CCD 111, reaction of the specimen S to which the optical stimulus is applied by the first stimulation optical system 7 and the second stimulation optical system 9 can be observed. In this case, similarly to the first embodiment, by the first stimulation optical system 7 and the second stimulation optical system 9, the plurality of regions in the specimen S can be simultaneously stimulated without a time lag or the intense stimulus can be applied to each given region, while keeping the light quantity level.

In the present embodiment, the combining dichroic mirror 33 is arranged on the light path between the excitation dichroic mirror 23 and the objective lens 3. However, instead, the combining dichroic mirror 33 may be arranged on the light path between the excitation dichroic mirror 23 and the image forming lens 109 or on the light path between the image forming lens 109 and the CCD 111. However, the configuration in which the combining dichroic mirror 33 is arranged at a position where the stimulus light does not need to be transmitted through the excitation dichroic mirror 23, that is, on the light path between the excitation dichroic mirror 23 and the objective lens 3, is most practical with little light quantity loss of the stimulus light.

The respective embodiments described above can be modified as follows.

Figure 14:
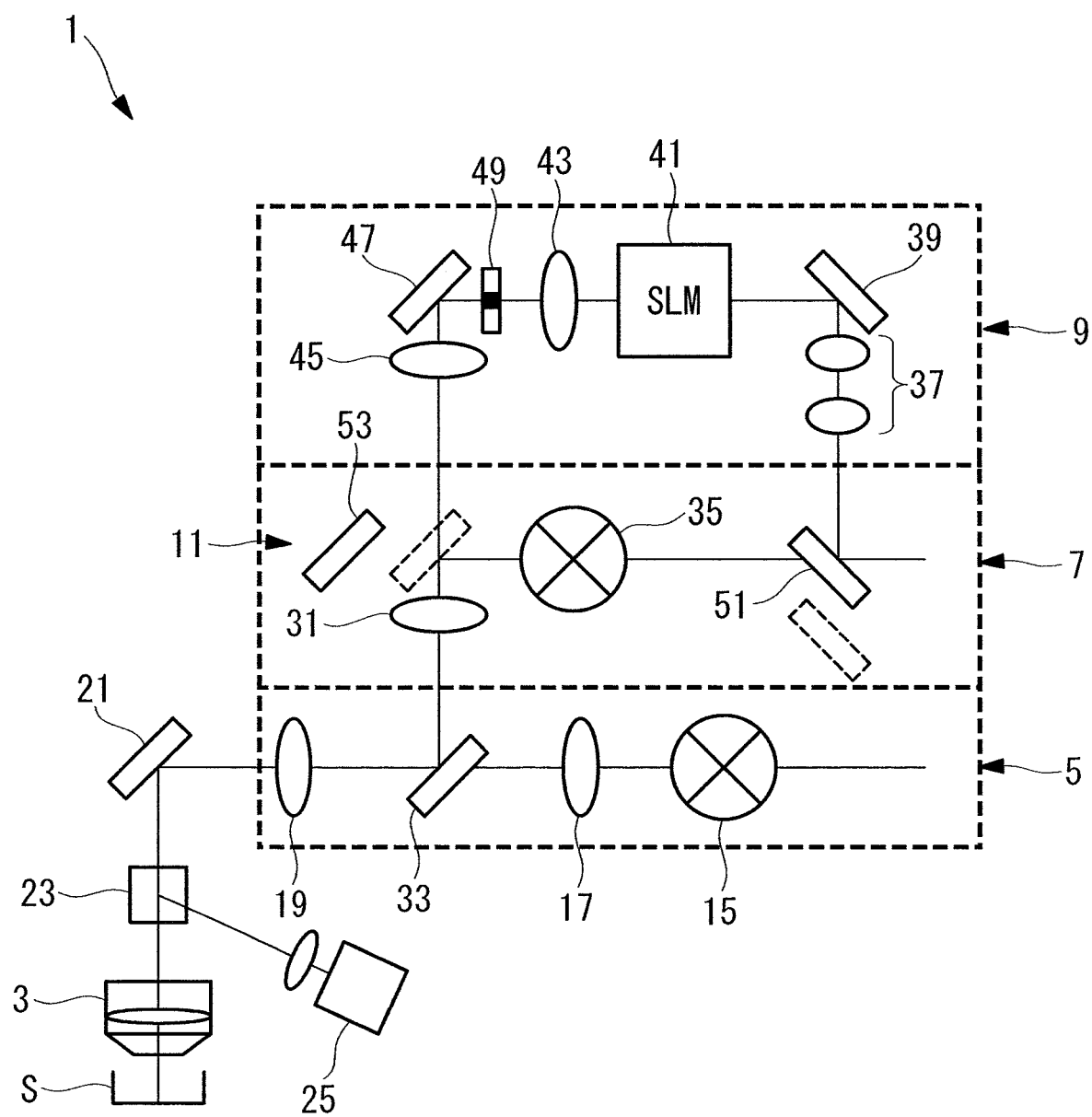
FIG. 14 is a schematic block diagram illustrating the microscope apparatus relating to a modification of the individual embodiments of the present invention.

That is, as illustrated in FIG. 14, the observation optical system 5, the first stimulation optical system 7 and the second stimulation optical system 9 may be stacked and arranged in a layer state. In this way, an installation area for one of the observation optical system 5, the first stimulation optical system 7 and the second stimulation optical system 9 is sufficient, and space around the microscope apparatus 1 can be saved. FIG. 14 illustrates an example of applying the microscope apparatus 1 of the first embodiment.

While the embodiments of the present invention are described above in details with reference to the drawings, a specific configuration is not limited to the embodiments and design change or the like in a range not departing from the scope of the present invention is also included. For example, the present invention is not limited to being employed in the above-described embodiments, and may be applied to embodiments formed by appropriately combining these embodiments without particular limitation.

From the above-described embodiments and modifications thereof, the following aspects of the invention are derived.

One aspect of the present invention is a microscope apparatus including: an objective lens that irradiates illumination light and stimulus light onto a specimen and collects observation light from the specimen; an observation optical system that makes the specimen be irradiated with the illumination light through the objective lens, and acquires image information of the specimen based on the observation light collected by the objective lens; a first stimulation optical system that includes a scanning section which scans the stimulus light irradiated by the objective lens, makes the scanning section scan an irradiation position of the stimulus light on the specimen and applies an optical stimulus to the specimen; a second stimulation optical system that includes a phase modulation element arranged at a pupil conjugate position of the objective lens and capable of modulating a phase of the stimulus light irradiated by the objective lens, selectively switches the irradiation position of the stimulus light on the specimen by the phase modulation element and applies the optical stimulus to the specimen; and a light path selecting section that selects at least one of a light path of the first stimulation optical system and a light path of the second stimulation optical system.

According to the present aspect, by the observation optical system, the specimen is irradiated with the illumination light through the objective lens and the observation light from the specimen is collected by the objective lens, the image information of the specimen is acquired, and thus the specimen can be observed based on the image information. In addition, by selecting the light path of the first stimulation optical system by the light path selecting section and scanning the irradiation position of the stimulus light on the specimen by the scanning section, the optical stimulus can be applied to each given region of the specimen. Furthermore, by selecting the light path of the second stimulation optical system by the light path selecting section and selectively switching the irradiation position of the stimulus light on the specimen by the phase modulation element, the light stimulus can be simultaneously applied to all or some of given regions of the specimen.

In this case, since the second stimulation optical system selectively switches the irradiation position on the specimen by modulating the phase of the stimulus light by the phase modulation element, a situation that some of the stimulus light is wasted without being utilized as in the case of using a DMD, does not occur. Therefore, the plurality of regions in the specimen can be simultaneously stimulated without a time lag or an intense stimulus can be applied to each given region, while keeping a light quantity level.

In the above-described aspect, the second stimulation optical system may include a light shielding member that shields 0-order light included in the stimulus light phase-modulated by the phase modulation element, and the scanning section may scan the stimulus light over a region on the specimen where the 0-order light is shielded by the light shielding member.

In an axial center of the stimulus light phase-modulated by the phase modulation element, the 0-order light not affected by phase modulation is included. Therefore, around a position irradiated by the 0-order light in the stimulus light in the specimen, the optical stimulus cannot be applied by a desired intensity distribution. Then, by shielding the 0-order light in the stimulus light phase-modulated by the phase modulation element by the light shielding member, the optical stimulus by an undesired intensity distribution can be prevented. In addition, for the region on the specimen where the 0-order light is shielded by the light shielding member, by scanning the stimulus light by the scanning section of the first stimulation optical system, the optical stimulus can be applied to a desired region on the specimen without omission.

In the above-described aspect, the scanning section may scan the stimulus light over a region of a difference between a stimulation region by the second stimulation optical system on the specimen and an observation visual field of the observation optical system.

For the phase modulation element, a resolution declines when the stimulation region is widened, and the resolution is improved when the stimulation region is narrowed. By such a configuration, even when the stimulation region is narrowed in order to secure the resolution of the phase modulation element, the stimulus light is scanned by the scanning section of the first stimulation optical system for the region of the difference between the stimulation region by the second stimulation optical system and the observation visual field of the observation optical system, so that the optical stimulus can be applied to a desired region on the specimen without omission.

In the above-described aspect, the second stimulation optical system may apply the optical stimulus to the specimen by an ultrashort pulse laser as the stimulus light.

With such a configuration, in the case of applying the optical stimulus to the specimen by the second stimulation optical system, a multiphoton effect can be more effectively generated.

In the above-described aspect, the first stimulation optical system and the second stimulation optical system may apply the optical stimulus to the specimen with the stimulus light emitted from a common light source.

With such a configuration, the need of preparing a light source for each stimulation optical system is eliminated, and a cost can be lowered as the number of the light sources is reduced.

In the above-described aspect, the light path selecting section may include a reflection member that reflects the stimulus light, and alternatively select the light path of the first stimulation optical system and the light path of the second stimulation optical system, according to changeover of insertion and detachment of the reflection member on the light path of the stimulus light.

By such a configuration, one of the light path of the first stimulation optical system and the light path of the second stimulation optical system is selected by inserting the reflection member on the light path of the stimulus light, and the other of the light path of the first stimulation optical system and the light path of the second stimulation optical system is selected by detaching the reflection member from the light path of the stimulus light. Therefore, light quantity loss of the stimulus light is reduced, and the optical stimulus can be alternately applied to the specimen by the first stimulation optical system and the second stimulation optical system.

In the above-described aspect, the light path selecting section may include a dichroic mirror that branches the stimulus light of a plurality of wavelengths emitted from a light source according to the wavelength, and select both of the light path of the first stimulation optical system and the light path of the second stimulation optical system according to the wavelength of the stimulus light by the dichroic mirror.

With such a configuration, the optical stimulus can be simultaneously applied to the specimen by the stimulus light of the different wavelengths by the first stimulation optical system and the second stimulation optical system.

In the above-described aspect, the light path selecting section may include a polarizing beam splitter that branches and combines the light path of the stimulus light emitted from the common light source, and a wavelength plate that adjusts a polarized light component of the stimulus light made incident on the polarizing beam splitter.

With such a configuration, according to an adjustment ratio of the polarized light component of the stimulus light by the wavelength plate, the optical stimulus can be applied to the specimen by one of the first stimulation optical system and the second stimulation optical system, or the optical stimulus can be simultaneously applied to the specimen by both of them.

REFERENCE SIGNS LIST 1, 71, 81, 91, 101 Microscope apparatus
3 Objective lens
5, 103 Observation optical system
7 First stimulation optical system
9 Second stimulation optical system
11, 59, 63, 73, 83, 93 Light path selecting section
27, 55 Stimulus light source (light source)
35 Scanning section
41 SLM (phase modulation element)

49 Mask (light shielding member)
51 First mirror (reflection member)
53 Second mirror (reflection member)
57 First dichroic mirror (dichroic mirror)
58 Second dichroic mirror (dichroic mirror)
85 First polarizing beam splitter (polarizing beam splitter)
87 Second polarizing beam splitter (polarizing beam splitter)
89 λ/2 plate (wavelength plate)
S Specimen

The invention claimed is:

1. A microscope apparatus comprising:
an objective lens that irradiates illumination light and stimulus light onto a specimen and collects observation light from the specimen;
an observation optical system that makes the specimen be irradiated with the illumination light through the objective lens, and acquires image information of the specimen based on the observation light collected by the objective lens;
a first stimulation optical system that includes a scanning section which scans the stimulus light irradiated by the objective lens, makes the scanning section scan an irradiation position of the stimulus light on the specimen and applies an optical stimulus to the specimen;
a second stimulation optical system that includes a phase modulation element arranged at a pupil conjugate position of the objective lens and capable of modulating a phase of the stimulus light irradiated by the objective lens, selectively switches the irradiation position of the stimulus light on the specimen by the phase modulation element and applies the optical stimulus to the specimen; and
a light path selecting section that selects at least one of a light path of the first stimulation optical system and a light path of the second stimulation optical system.

2. The microscope apparatus according to claim 1,
wherein the second stimulation optical system includes a light shielding member that shields 0-order light included in the stimulus light phase-modulated by the phase modulation element, and
wherein the scanning section scans the stimulus light over a region on the specimen where the 0-order light is shielded by the light shielding member.

3. The microscope apparatus according to claim 1, wherein the scanning section scans the stimulus light over a region of a difference between a stimulation region by the second stimulation optical system on the specimen and an observation visual field of the observation optical system.

4. The microscope apparatus according to claim 1, wherein the second stimulation optical system applies an optical stimulus to the specimen by an ultrashort pulse laser as the stimulus light.

5. The microscope apparatus according to claim 1, wherein the first stimulation optical system and the second stimulation optical system apply the optical stimulus to the specimen with the stimulus light emitted from a common light source.

6. The microscope apparatus according to claim 1, wherein the light path selecting section includes a reflection member that reflects the stimulus light, and alternatively selects the light path of the first stimulation optical system and the light path of the second stimulation optical system, according to changeover of insertion and detachment of the reflection member on the light path of the stimulus light.

7. The microscope apparatus according to claim 1, wherein the light path selecting section includes a dichroic mirror that branches the stimulus light of a plurality of wavelengths emitted from a light source according to the wavelength, and selects both of the light path of the first stimulation optical system and the light path of the second stimulation optical system according to the wavelength of the stimulus light by the dichroic mirror.

8. The microscope apparatus according to claim 5, wherein the light path selecting section includes a polarizing beam splitter that branches and combines the light path of the stimulus light emitted from the common light source, and a wavelength plate that adjusts a polarized light component of the stimulus light made incident on the polarizing beam splitter.

9. The microscope apparatus according to claim 2, wherein the scanning section scans the stimulus light over a region of a difference between a stimulation region by the second stimulation optical system on the specimen and an observation visual field of the observation optical system.

10. The microscope apparatus according to claim 2, wherein the second stimulation optical system applies an optical stimulus to the specimen by an ultrashort pulse laser as the stimulus light.

11. The microscope apparatus according to claim 3, wherein the second stimulation optical system applies an optical stimulus to the specimen by an ultrashort pulse laser as the stimulus light.

12. The microscope apparatus according to claim 9, wherein the second stimulation optical system applies an optical stimulus to the specimen by an ultrashort pulse laser as the stimulus light.

13. The microscope apparatus according to claim 2, wherein the first stimulation optical system and the second stimulation optical system apply the optical stimulus to the specimen with the stimulus light emitted from a common light source.

14. The microscope apparatus according to claim 3, wherein the first stimulation optical system and the second stimulation optical system apply the optical stimulus to the specimen with the stimulus light emitted from a common light source.

15. The microscope apparatus according to claim 4, wherein the first stimulation optical system and the second stimulation optical system apply the optical stimulus to the specimen with the stimulus light emitted from a common light source.

16. The microscope apparatus according to claim 9, wherein the first stimulation optical system and the second stimulation optical system apply the optical stimulus to the specimen with the stimulus light emitted from a common light source.

17. The microscope apparatus according to claim 10, wherein the first stimulation optical system and the second stimulation optical system apply the optical stimulus to the specimen with the stimulus light emitted from a common light source.

18. The microscope apparatus according to claim 11, wherein the first stimulation optical system and the second stimulation optical system apply the optical stimulus to the specimen with the stimulus light emitted from a common light source.

19. The microscope apparatus according to claim 12, wherein the first stimulation optical system and the second stimulation optical system apply the optical stimulus to the specimen with the stimulus light emitted from a common light source.

* * * * *